(12) United States Patent
Fukumoto

(10) Patent No.: US 6,885,617 B2
(45) Date of Patent: Apr. 26, 2005

(54) OPTICAL DISK APPARATUS

(75) Inventor: Makoto Fukumoto, Hamura (JP)

(73) Assignee: TEAC Corporation, Tokyo (JP)

( * ) Notice: Subject to any disclaimer, the term of this patent is extended or adjusted under 35 U.S.C. 154(b) by 206 days.

(21) Appl. No.: 10/180,816

(22) Filed: Jun. 25, 2002

(65) Prior Publication Data

US 2003/0007435 A1 Jan. 9, 2003

(30) Foreign Application Priority Data

Jun. 25, 2001 (JP) ........................................ 2001-190670

(51) Int. Cl.⁷ ................................................ G11B 7/00
(52) U.S. Cl. .................... 369/47.53; 369/47.5; 369/53.1
(58) Field of Search ............................ 369/47.53, 47.5, 369/47.51, 47.52, 47.1, 53.1, 53.11, 53.45, 59.1, 59.11, 59.12, 116

(56) References Cited

U.S. PATENT DOCUMENTS

| | | | | |
|---|---|---|---|---|
| 5,559,785 A | * | 9/1996 | Honda et al. ............ | 369/59.12 |
| 5,740,149 A | | 4/1998 | Iwasaki et al. | |
| 5,761,179 A | | 6/1998 | Iwasaki et al. | |
| 5,872,763 A | * | 2/1999 | Osakabe ................ | 369/47.53 |
| 6,285,647 B1 | * | 9/2001 | Van Woudenberg et al. ..... | 369/116 |
| 6,392,970 B1 | * | 5/2002 | Fuji et al. ................ | 369/47.5 |
| 6,646,965 B1 | | 11/2003 | Kim | |
| 2002/0105874 A1 | | 8/2002 | Matsumoto | |

FOREIGN PATENT DOCUMENTS

| | | |
|---|---|---|
| JP | 7-85494 | 3/1995 |
| JP | 9-138947 A | 5/1997 |
| JP | 2001-060320 | 3/2001 |
| JP | 2002/260230 A | 9/2002 |

* cited by examiner

*Primary Examiner*—Muhammad Edun
(74) *Attorney, Agent, or Firm*—Christensen O'Connor Johnson Kindness PLLC

(57) ABSTRACT

Recording power is optimized in an optical disk apparatus by recording a test signal on an optical disk while varying the recording power, and then determining a $\beta$ value from a reproduced signal. A controller calculates a change in $\beta$ value with respect to the recording power. A target $\beta$ value is selected from those within the range wherein the $\beta$ value varies linearly. The recording power by which the target $\beta$ value is produced is selected as an optimum recording power for recording data on the optical disk. A modulation factor or parameters other than the $\beta$ value may also be used as an indication of quality of reproduced signals.

19 Claims, 6 Drawing Sheets

OPTICAL DISK APPARATUS

BACKGROUND OF THE INVENTION

1. Field of the Invention

The present invention relates generally to an optical disk apparatus, and more particularly to optimization of recording power.

2. Description of the Related Art

In optical disk apparatuses capable of recording data on a media like a CD-R (compact disk-recordable) disk, optimization of recording power using a process referred to as "OPC" (optimum power control) is commonly performed. In OPC, test signals are written onto a predetermined recording area of an optical disk while recording power is varied among a plurality of levels over a corresponding-number of frames, for example, 15 levels over 15 frames, and the test signal are reproduced for evaluation of a signal quality. As a measure of quality of a reproduced signal, usually a $\beta$ value is used. $\beta$ value is a parameter calculated using the equation $\beta=(A+B)/(A-B)$, where A and B are peak and bottom voltages of the envelope of the reproduced RF signal, respectively. When this $\beta$ value so obtained is within a predetermined range (for example, 0.04 to 0.05), the recording power is determined as optimum. Then, the recording power by which a desired $\beta$ value (target $\beta$ value) is produced is selected as the optimum recording power, and later data recording operations are performed at this optimum recording power.

Japanese Patent Laid-Open Publication No. Hei 7-85494 discloses a technique for obtaining an optimum recording power comprising steps of determining two $\beta$ values which are lower and higher than a desired $\beta$ value respectively, predicting an expected recording power level by which the desired $\beta$ value will be obtained based on a calculation using the lower and higher $\beta$ values, and setting the power level closest to the expected level as an optimum recording power.

However, because any of a variety of optical disks can be used for recording, the target $\beta$ value varies accordingly. It is possible to select the optimum recording power using a predetermined default $\beta$ value, however, this does not necessarily provide an optimum recording quality. In some cases, a recording power is determined based on a $\beta$ value higher than the substantially optimum $\beta$ value. This can cause thermal waveform distortion of an RF signal such that it becomes impossible to reproduce that signal.

An optical disk usually has a unique disk ID prerecorded thereon, and thus it is possible to calculate a target $\beta$ values for each disk ID and store the resultant target $\beta$ value into a table held at the optical disk apparatus side. However, the associated process is very complex. In addition, this method does not addresses situations where a user attempts to record on an optical disk for which a target $\beta$ value has not been stored.

SUMMARY OF THE INVENTION

It is an object of the present invention to provide an optical disk apparatus capable of selecting an optimum recording power for any optical disk on which recording of data is desired.

The optical disk apparatus of the invention comprises means for recording test signals on an optical disk while varying a recording power, means for reproducing the test signals, means for detecting quality of each reproduced signal, means for selecting a target quality value according to variations in quality of the reproduced signals which are analyzed for each recording power, and means for optimizing the recording power according to the target quality value. Available indications of reproduced signal quality include, but are not limited to, $\beta$ value and modulation factor. Taking $\beta$ value as an example, generally, $\beta$ value varies with the recording power, and the variation in $\beta$ value exhibits a specific tendency. That is, $\beta$ value increases approximately linearly as the recording power increases within a certain range. However, when the recording power increases beyond or exceeds this range, thermally distorted pits are formed in the optical disk and the variation in $\beta$ value becomes nonlinear. Accordingly, the $\beta$ range wherein there is no thermal waveform distortion and the $\beta$ range wherein thermal waveform distortion is induced can be discerned from changes in a signal quality such as $\beta$ value. Therefore, by selecting a target quality value falling within the $\beta$ range wherein thermal waveform distortion is not induced, a target quality value appropriate for the disk can be selected. Once the target quality value is established, the recording power can be optimized by searching for the recording power by which this target quality value is produced.

The present invention is applicable to any type of optical disk on which data can be recorded, including, for example, CD-R (compact disk-recordable), CD-RW (compact disk-rewritable), and DVD-R (digital video disk-recordable) disks.

The present invention will be more clearly understood with reference to the following description of preferred embodiments thereof. However, the present invention is not limited to the specific embodiments described herein.

DESCRIPTION OF THE PREFERRED EMBODIMENTS

Preferred embodiments of the invention will be described below with reference to the drawings.

Figure 1:
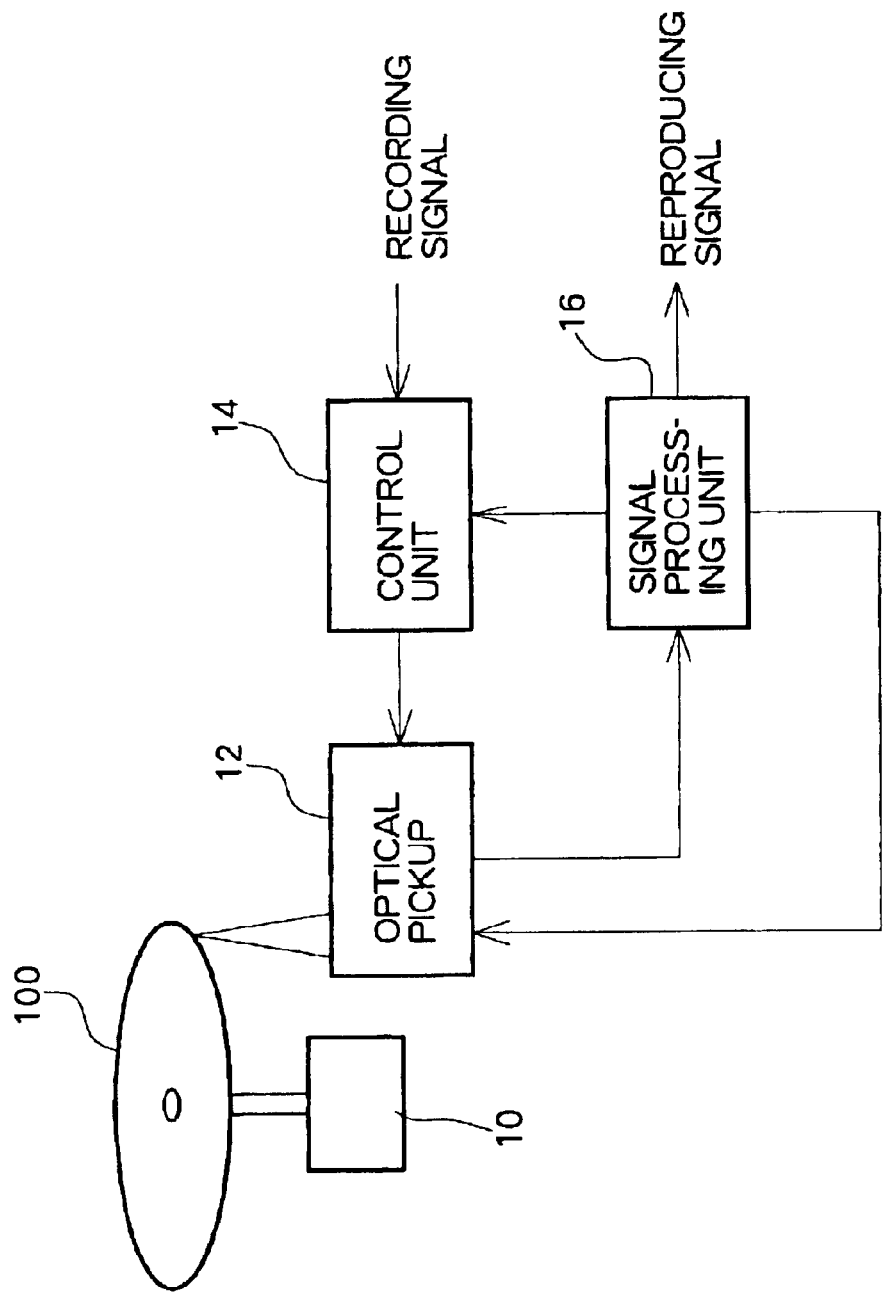
FIG. 1 is a block diagram showing essential components of an optical disk apparatus.

FIG. 1 shows a block diagram illustrating essential components of an optical disk apparatus according to one embodiment of the present invention. The optical disk apparatus comprises an optical pickup 12, a control unit 14, and a signal processing unit 16.

The optical pickup unit 12 irradiates laser light onto an optical disk 100, which is rotationally driven by a spindle motor 10, in order to record or reproduce data. The control unit 14 supplies a driving signal for recording, and data is recorded by forming a pit sequence having a period in the range of 3T to 11T (for DVD, 3T to 14T) on the optical disk 100. Further, the optical pickup unit 12 irradiates laser light having a reproducing power level onto an optical disk 100, and supplies the signal processing unit 16 with an RF signal reproduced from the reflected light.

The signal processing unit 16 demodulates the received RF signal and outputs the resultant signal as reproduced data. Demodulation is performed with the help of an equalizer and a PLL circuit which generate a clock signal after cutting noise using a filter. Also, the signal processing unit 16 detects a tracking error signal or a focusing errors signal from the reflected light and supplies a servo signal to the optical pickup unit 12.

The control unit 14 generates a driving signal for driving an LD (laser diode) in the optical pickup unit 12 and OPC (optimum power control) is performed before actual data recording. More specifically, OPC is performed, as noted above, by writing test signals in a predetermined recording area of an optical disk 100 while the recording power is varied, for example, in 15 levels over 15 frames, and reading back each test signal to detect its $\beta$ value. After determining the $\beta$ value for each recording power, the control unit 14 sequentially stores the $\beta$ values as a function of the recording power, and selects the recording power, by which the target $\beta$ value is calculated, as the optimum recording power. While the control unit 14 has used a default value (for example, 0.04) as the target $\beta$ value in the prior art, the target$\beta$ value is dynamically established according to the individual optical disk 100 in the present embodiment.

When selecting the optimum recording power for recording data, the control unit 14 may control the recording power further using a ROPC (running optimum power control) technique. In an ROPC technique, the intensities of light reflected from pits during OPC and during data recording are compared, and recording power is adjusted to optimum on-the-fly so as to maintain substantially equal intensities.

Figure 2:
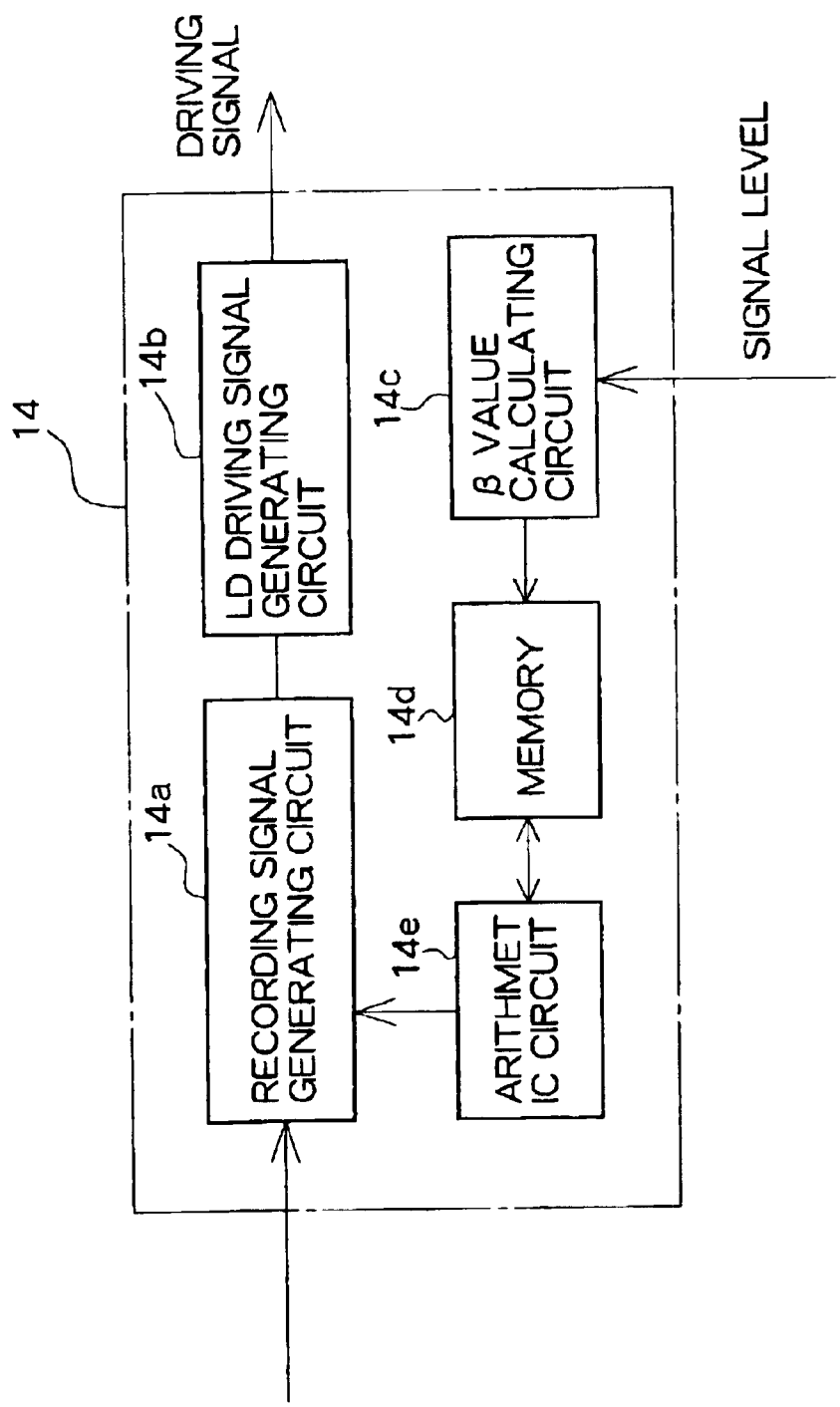
FIG. 2 is a block diagram illustrating a configuration of the control unit shown in FIG. 1.

FIG. 2 is a block diagram illustration a configuration of the control unit 14. The control unit 14 consisting of a DSP (digital signal processor) or the like, and includes functional blocks such as a recording signal generator circuit 14a, an LD (laser diode) driving signal generator circuit 14b, a $\beta$ value calculating circuit 14c, memory 14d, and an arithmetic circuit 14e.

The recording signal generator circuit 14a modulates a recording signal by EFM (eight fourteen modulation) and outputs the resultant serial recording signals at a data transmission rate according to a recording rate for an optical disk 100. Preferably, the serial recording signals are sent out after compensation is performed based on predetermined recording strategies. The recording strategies can be roughly classified into one of two methods:

a method for controlling a level of a recording pulse, and a method for controlling a length of a recording pulse.

Of these, in the former a recording laser power is increased by adding a pulse (boosting pulse) at the start of the recording pulse, while in the latter both $(n-\theta)T+\Delta$ (where n=3 to 11, $\theta$ is a constant) and a length of a recording pulse are adjusted based on to a pit length nT to be recorded. Thus, a pit length can be formed as desired by controlling a level and/or length of the recording pulse, such that significant degradation in the recording signals, such as jitter, can be reduced. The boosting pulse is usually added at a constant rate to the level of a recording pulse (recording power).

During OPC, the memory 14d outputs pulses associated with the fifteen recording powers different in level which have been pre-stored in the memory 14d in tabular form so as to drive the LD of the optical pickup unit 12 via the LD driving signal generator circuit 14b.

The $\beta$ value calculating circuit 14c calculates $\beta$ values using an equation $\beta=(A+B)/(A-B)$ from RF signal envelopes of test signals recorded with fifteen recording powers different in level, where A is a peak voltage and B is a bottom voltage. A total of fifteen $\beta$ values calculated for each of frames or for each of recording powers are sequentially supplied to the memory 14d.

In the memory 14d is stored a default target $\beta$ value (for example, 0.04) and the $\beta$ values calculated by the $\beta$ value calculating circuit 14c, after each $\beta$ value is associated ot its recording power.

The arithmetic circuit 14e selects the optimum recording power according to the $\beta$ values associated with the recording powers stored in the memory 14d. Specifically, the rate of change of $\beta$ value is calculated and the target $\beta$ value of the optical disk 100 is selected according to the magnitude of the rate value. That is, although a default $\beta$ value (initial value) is stored in the memory 14d, as described above, the arithmetic circuit 14e, instead of directly employing this default value, determines whether the default $\beta$ value is appropriate according to the rate of change of the $\beta$ value with respect to recording power. The default $\beta$ value is only designated as the target $\beta$ value by the arithmetic circuit 14e when it has been determined that it is an appropriate value. When the value is determined to be inappropriate, the arithmetic circuit 14e selects a new target $\beta$ value for establishing the optimum recording power. The arithmetic circuit 14e then transfers the recording power by which this target $\beta$ value is produced to the recording signal generating circuit 14a as the optimum recording power.

Figure 3:
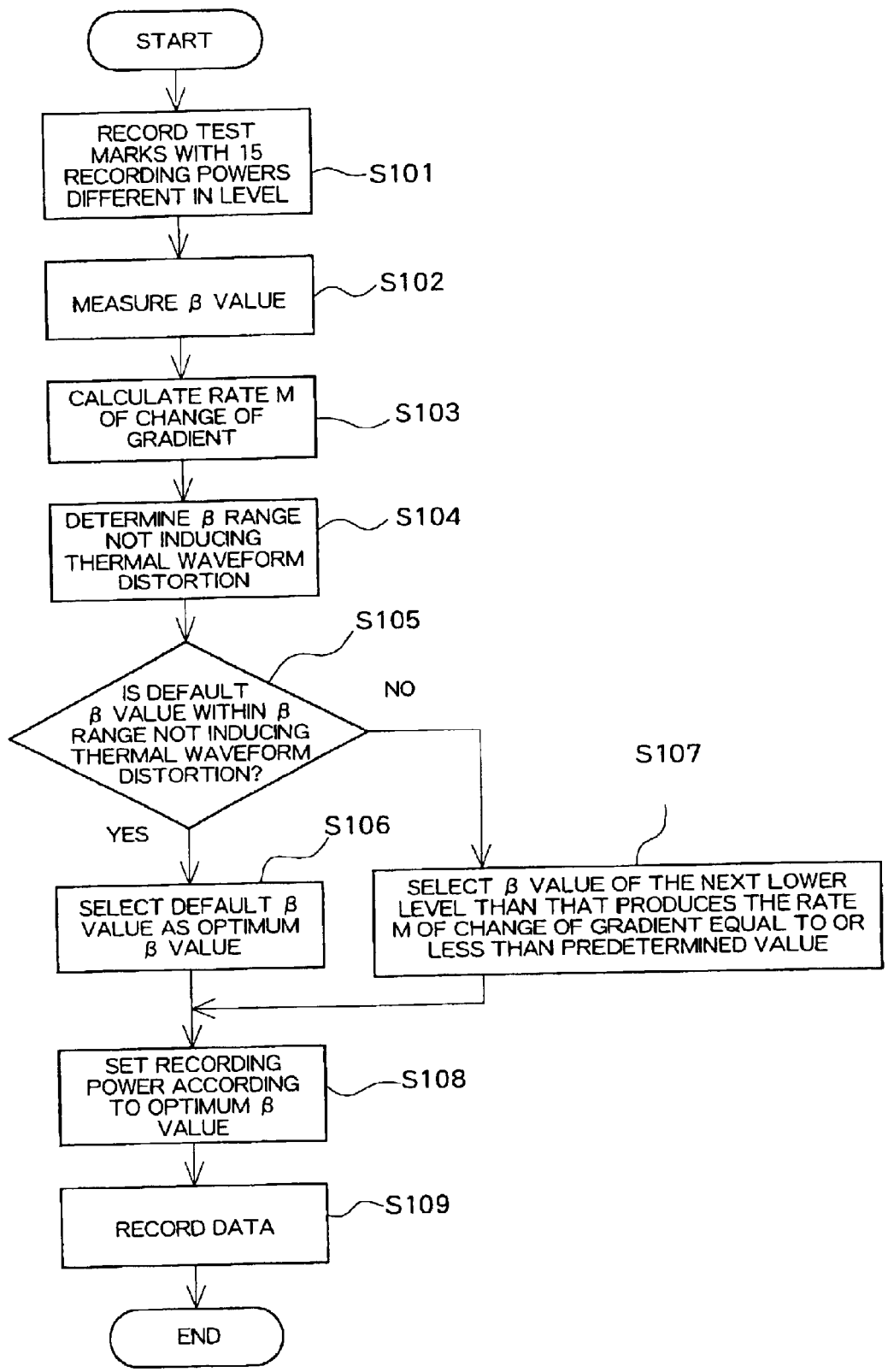
FIG. 3 is a flowchart of processing in an embodiment of the present invention.

FIG. 3 is a flowchart of the flow of OPC processing in the control unit 14. First, test signals are recorded in a predetermined area, i.e. a PCA (power calibration area) of an optical disk 100, at, for example, fifteen different recording power levels (S101), Pw1, Ps2, –Pw15. Then the test signals recorded at respective recording powers are sequentially read out and $\beta$ values corresponding to the respective recording powers, $\beta$1, $\beta$2, –$\beta$15, are calculated (S102).

The control unit 14 then calculates the rates M of change of gradient of $\beta$1 to $\beta$15 stored in the memory 14d (S103). Here, gradient refers to the rate of change of $\beta$ with respect to the recording power, and the rate of change of gradient refers to the rate of change of gradient of $\beta$ with respect to the associated recording power. The gradient K can be obtained by dividing a difference between two adjacent $\beta$ values by a difference between their recording powers. For example, gradient K2 is calculated using an equation K2= ($\beta$2–$\beta$1)/(Pw2–Pw1). The range M of change of gradient can be obtained by dividing a gradient by an adjacent gradients. For example, range M3 of change of gradient is calculated using an equation M3=K3/K2.

Table 1 lists the gradients K and the rates M of change of gradient, both of which are calculated as described above and stored in the memory 14d.

TABLE 1

| RECORDING POWER | CALCULATED β | GRADIENT (RATE OF CHANGE OF β) | RATE OF CHANGE OF GRADIENT |
|---|---|---|---|
| PW1 | β1 | — | — |
| PW2 | β2 | K2 = (β2−β1)/(Pw2−Pw1) | — |
| PW3 | β3 | K3 = (β3−β2)/(Pw3−Pw2) | M3 = K3/K2 |
| PW4 | β4 | K4 = (β4−β3)/(Pw4−Pw3) | M4 = K4/K3 |
| PW5 | β5 | K5 = (β5−β4)/(Pw5−Pw4) | M5 = K5/K4 |
| PW6 | β6 | K6 = (β6−β5)/(Pw6−Pw5) | M6 = K6/K5 |
| PW7 | β7 | K7 = (β7−β6)/(Pw7−Pw6) | M7 = K7/K6 |
| PW8 | β8 | K8 = (β8−β7)/(Pw8−Pw7) | M8 = K8/K7 |
| PW9 | β9 | K9 = (β9−β8)/(Pw9−Pw8) | M9 = K9/K8 |
| PW10 | β10 | K10 = (β10−β9)/(Pw10−Pw9) | M10 = K10/K9 |
| PW11 | β11 | K11 = (β11−β10)/(Pw11−Pw10) | M11 = K11/K10 |
| PW12 | β12 | K12 = (β12−β11)/(Pw12−Pw11) | M12 = K12/K11 |
| PW13 | β13 | K13 = (β13−β12)/(Pw13−Pw12) | M13 = K13/K12 |
| PW14 | β14 | K14 = (β14−β13)/(Pw14−Pw13) | M14 = K14/K13 |
| PW15 | β15 | K15 = (β15−β14)/(Pw15−Pw14) | M15 = K15/K14 |

Nest, the relationship between the recording power and the β value will be described. Generally, the β value increases at a constant rate with respect to increase in the recording power, but when the recording power exceeds a certain value, a thermal waveform distortion is induced in an RF signal and the β value thereafter varies nonlinearly with a small rate of change, possibly because the shape of a pit is distorted by excessive heat such that a portion of heat energy is radiated away. Because of this property, it is possible to determine that, when the gradient of a certain β value decreases and is no longer linear, the recording power corresponding to the β value is inappropriate because the thermal distortion is produced.

Figure 4:
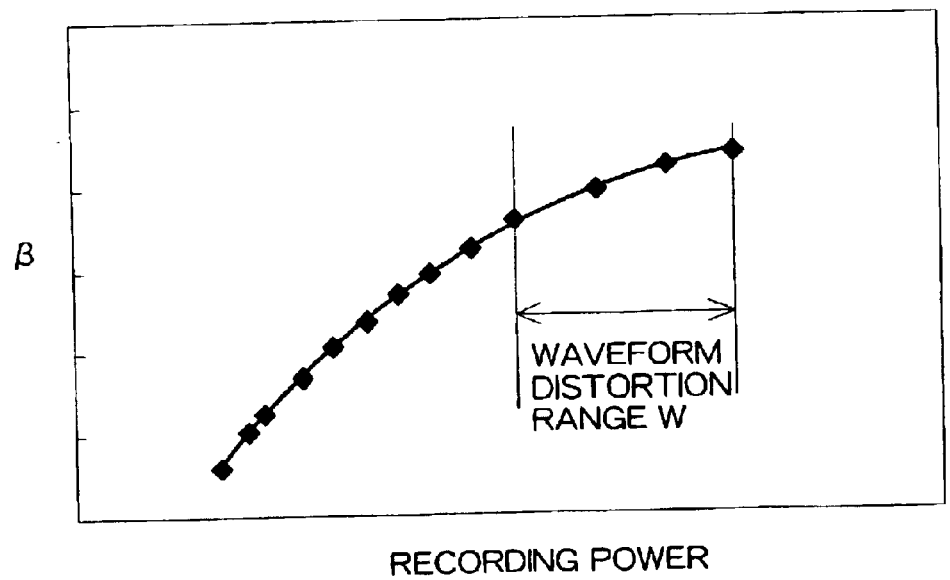
FIG. 4 is a plot showing the relationship between a recording power and a $\beta$ value.

FIG. 4 shows a relationship between the recording power and the β value. As can be seen, the region where the β value linearly varies is the range wherein no thermal distortion is produced, while the region where the β value nonlinearly varies is the range W wherein thermal distortion is produced. The recording power is selected from the range W wherein thermal distortion may result, but selected from the range wherein there is no thermal distortion.

As can be seen from Table 1, β varies substantially linearly as is shown in FIG. 4 within the range of recording power without no thermal waveform distortion, whereby the rate M of change of gradient becomes approximately equal to 1 within this range. On the other hand, within the range of recording power by which thermal waveform distortion is produced, the gradient of the β value, that is the rate of change of β value decreases and the relationship $K_i > K_{i+1}$ is formed, and, thus, the rate of change of gradient determined according to $MN_{i+1} = K_{i+1}/K_i$ becomes smaller than 1.

Figure 5:
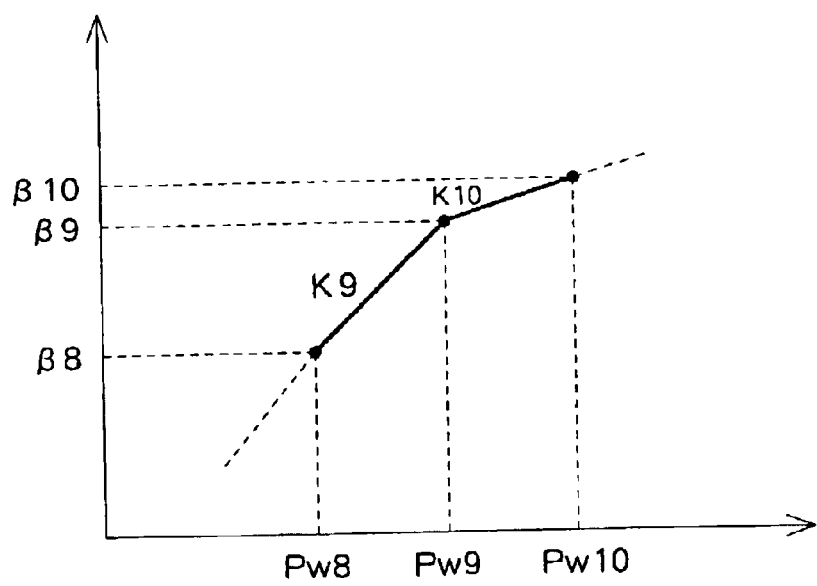
FIG. 5 is a graphical representation showing a change of gradient of $\beta$ value.

Thus, the control unit 14 is capable of determining the range of β values (hereinafter referred as "β range") with no thermal distortion according to the magnitude of this rate M of change of gradient (S104). Specifically, magnitudes lie between the rate of change of gradient and a predetermined threshold value Mth (Mth<1). If M>Mth, it is determined that thermal waveform distortion is not caused, however, if M<=Mth, it is determined that thermal waveform distortion is caused. As an example, when M9=K9/K8 is approximately equal to 1 and M10=K10/K9 is less than or equal to Mth below 1, as shown in FIG. 5, it is determined the range from β1 to β8 is that no thermal distortion is produced. Mth can be 0.7, for example.

After the β range wherein thermal distortion is not induced is identified, the control unit 14 then determines whether the default β value stored in the memory 14d falls within the determined β range. If the default β value is within this range, the control unit 14 determines that the default β value may be used, and selects this default β value as a target β value (optimum β value) (S106).

On the other hand, if the default β value falls outside of this range, for example, when the relevant β range is β1–β8 and the default β value is larger than β8, thermal distortion will be induced if this default β value is used without any adjustment. Accordingly, the control unit 14 selects the β value of the next level lower than that which produces the rate M of change of gradient equal to or less than a predetermined threshold value Mth as the target β value (optimum β value) (S107). In the example illustrated in FIG. 5, as the β value which produces the rate M of change of gradient equal to or less than the threshold value Mth is β9, β8 which is the value immediately below β9 is selected as the target β value. Through this process, the largest β values which induce thermal waveform distortion is selected as the target β value.

After selecting the target β value as described above, the control unit 14 selects the recording power, by which the target β value is produced, from among the fifteen levels of recording powers, and establishes the selected power as the optimum recording power (S108). In the example shown in FIG. 5, Pw8 capable of obtaining β8 is selected as the optimum recording power. Then, data is recorded at that optimum recording power (S109).

As described above, in accordance with this embodiment, a β range wherein thermal waveform distortion is not produced is determined according to the magnitude of the rate of change of gradient of β value and a target β value is selected so as to fall within this range. Therefore, data can be recorded on a given optical disk 100 without inducing thermal waveform distortion.

While the default β value is stored in the memory 14d in the present embodiment, a fixed value (for example, 0.04) may be pre-stored as the default β value. Of course, when such default β is not specified, zero (0) may be used as the default β value for the processing of S105.

Further, in the example illustrating the present embodiment, the appropriateness of the default β value is determined according to whether of not the default β value is within the β range not inducing thermal waveform distortion which is extracted according to the rate of change of β value, and, if determined to be inappropriate, a target value is selected from the β range wherein thermal waveform distortion is not induced. Specifically, control needs only continue to S107 just after the β range not inducing thermal waveform distortion is extracted in S104.

Figure 6:
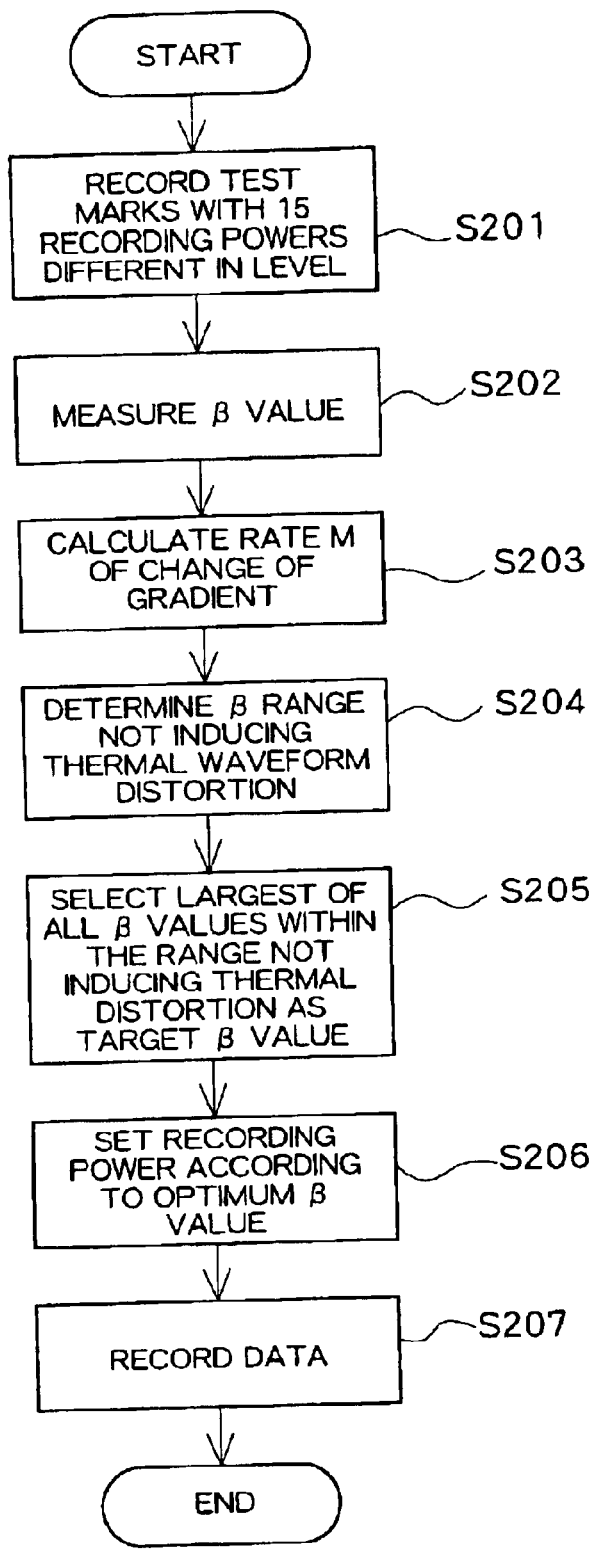
FIG. 6 is a flowchart of processing in a further embodiment of the present invention.

FIG. 6 shows a flowchart of processing in a further embodiment of the present invention. Here, the series of processing steps from S201 to S204 correspond to the series of processing steps S101 to S104 in FIG. 3. At S204, after the β range wherein thermal waveform distortion is not induced is determined, the optimum β value is selected from the β range wherein thermal waveform distortion is not induced. Specifically, the largest of all β values within the range wherein thermal waveform distortion is not induced is selected as the target β value (S205). Subsequent processing steps from S206 to S207 again correspond to steps S108 to 109 shown in FIG. 3.

Further, in the present embodiment, the β range not inducing thermal waveform distortion is extracted using the rate M of change of gradient, and then the target β value is selected therefrom. However, the target β value may be selected according to the gradient K, which reflects the rate of change of β value. Specifically, the gradient K is compared with a predetermined value, the β value less than or equal to the predetermined value is identified, and the next lower β value is selected. The next lower β value may be set as the target β value. More specifically, with reference to FIG. 5, when K9>K10 and K10 is beneath the predetermined value, β8, which is next value lower than the β at this point (β9), is determined to be the target value.

Figure 7:
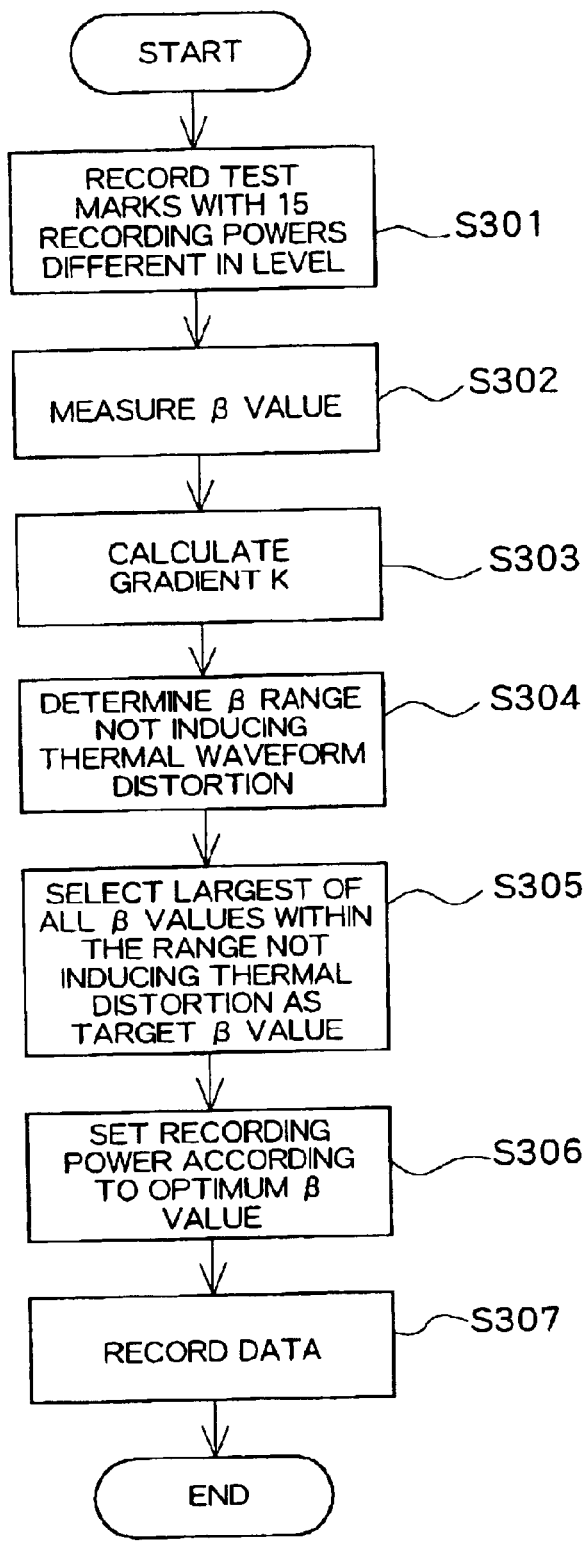
FIG. 7 is a flowchart of processing in a still further embodiment of the present invention.

FIG. 7 shows a flowchart showing a processing in additional embodiment of the present invention. Here, steps from S3201 to S302 are the same as steps S201 to S202 in FIG. 6. In FIG. 6, the gradient K of the β value and the rate M of change of the gradient of the β value are both calculated (S203). In FIG. 7, however, only the gradient K of the β value is calculated (S303). The β range wherein thermal waveform distortion is not induced is then determined using this gradient K (S304). That is, the gradient K is compared with a predetermined value, and the β range wherein the gradient K is larger than the predetermined value is identified as the β range wherein thermal waveform distortion is not induced. The steps from S305 to S307 then again correspond steps S205 to S207 in FIG. 6.

Further, in the present embodiment, even if the default β value falls within the β range wherein thermal waveform distortion is not induced, another β value between the default β value and the upper range limit β value (for example, the midpoint) may be set as the target β value.

Further, in the present invention, when an optimum β value is pre-stored in a disk ID of an optical disk 100, the series of processing shown in FIG. 3 may be performed by reading out this β value and storing the β value as a default β value in the memory 14d. When this is done, it is considered that the default β value is usually set to the target β value in S106. However, when the default β value deviates from the optimum value due to reasons such as deterioration of disk properties over time, a β value different from the default value is selected as the target β value in S107.

Further, when data is recorded together with a land and groove of the optical disk 100, the optimum recording power differs between the land and groove. Therefore, it is preferable to separately subject the land and groove to the processing shown in FIG. 3 and determine a separate target β value for each.

While the present embodiment has been described using the example of a CD-R disk, OPC is also used in modulation in the CD-RW and other systems. That is, a recording power near the value where a modulation factor begins to become saturated based on the relationship between the recording power and the modulation factor is set as the optical power. However, because it is difficult to directly calculate the point at which the modulation factor begins to become saturated, the rate γ of change of modulation factor is used to determine the optimum recording power by multiplying a coefficient by a recording power by which a certain value of rate γ is produced. Accordingly, for CD-RW and the like, it is necessary to determine the target modulation factor according to the magnitude of the rate γ of change of modulation factor or the rate of change of γ, and to select the optimum recording power according to the target modulation factor.

Further, according to the present invention, β values may be classified as belonging to one of two ranges according to the gradient (the rate of change) of β value or the rate of change of gradient:

a range without thermal waveform distortion, and a range wherein thermal waveform distortion can be identified.

The target β value is selected from the β range wherein thermal waveform distortion is not induced. In general, the change in reproduced signal quality with respect to the recording power differs between the β range wherein thermal waveform distortion is induced and the β range wherein thermal waveform distortion is not induced. However, these changes are not always steep or discontinuous. Although in the present embodiment, a β value is selected such that the change in β value is relatively convenient for discriminating both ranges, the present invention is not limited to the techniques using β value. It is, for example, also possible to set a target quality value using a plurality of parameters, where appropriate. Further, the optimum recording power may be established by determining the target β value and the target modulation factor and selecting a recording power which satisfies these two target values as the optimum recording power.

Further, in the present invention, β values are divided into two ranges according to the magnitude of the change of β value, a range wherein thermal waveform distortion is induced, and a range wherein thermal waveform distortion is not induced. However, such a classification system is only given as an expedient example. In actual processing, a target β value may be determined without classification. That is, the target β value can be selected by detecting β values while varying the recording power, comparing two adjacent β values with a threshold value, and determining, as the target value, the largest β value by which a difference value equal to or larger than the threshold value is obtained. Here, it is preferable that the recording power be changed in at least three different stages because at least three recording powers of different levels are required to monitor the rate of change of the target β value. On the other hand, for monitoring the rate of change of rate of change of target β value (that is, the rate of change of gradient of β value), at least 4 recording powers of different levels are required. A simple procedure for accomplishing this is to record test marks (test signals) on an optical disk while varying the recording power in equal increments as P1, P2, - - - P3, reproduce the marks, and determine respective values for β1, β1, - - - β3 accordingly. After this has been done, $\Delta\beta1=\Delta\beta2-\Delta\beta1$ and $\Delta\beta2=\Delta\beta3-\Delta\beta2$ are calculated and $\Delta\beta2$ and $\Delta\beta1$ are compared with a predetermined threshold value S. If $\Delta\beta1>s$ and $\Delta\beta2<s$, then $\Delta\beta2$ is selected as the target β value.

What is claimed is:

1. An optical disk apparatus, comprising:
means for recording test signals on an optical disk while varying a recording power;
means for reproducing the test signals;

means for detecting quality of the reproduced signal by detecting a quality value indicative of the quality of the reproduced signal;

means for selecting a target quality value dynamically for said optical disk according to variation of the quality value being indicative of the quality of the reproduced signals which is detected for each recording power; and means for optimizing the recording power according to the target quality value.

2. The optical disk apparatus according to claim 1, wherein the means for selecting a target quality value selects the target quality according a gradient K;

where K=(amount of change in quality of reproduced signal)/(amount of change in recording power).

3. The optical disk apparatus according to claim 2, wherein the means for selecting a target quality value selects the target quality value from the reproduced signal quality values which fall within a range wherein the gradient K is greater than or equal to a predetermined value.

4. The optical disk apparatus according to claim 2, wherein the means for selecting a target quality value determines a thermally proper range according to the magnitude of the gradient K, and selects a target quality value which falls within the thermally proper range.

5. The optical disk apparatus according to claim 2, wherein the means for selecting a target quality value selects the target quality value according to the reproduced signal quality within a range of quality values having a rate of a change of the gradient K greater than or equal to a predetermined value.

6. The optical disk apparatus according to claim 2, wherein the means for selecting a target quality value determines a thermally proper range according to the magnitude of a rate of change of the gradient K, and selects the target quality value from among values within the thermally proper range.

7. The optical disk apparatus according to claim 1, wherein the means for detecting quality of the reproduced signal detects a $\beta$ value as the quality of the reproduced signal.

8. The optical disk apparatus according to claim 1, wherein the means for detecting quality of the reproduced signal detects a modulation factor as the quality of the reproduced signal.

9. The optical disk apparatus according to claim 1, further comprising means for storing an initial value of the quality of the reproduced signal, wherein the means for selecting a target quality value determines the target quality value according to the initial value and the variation of the change in quality of reproduced signals.

10. The optical disk apparatus according to claim 9, wherein the means for selecting a target quality value selects the initial value as a target value when the initial value is within the range of reproduced signal quality values having a gradient K greater than or equal to a predetermined value, said K being defined as K=(amount of change in quality of reproduced signal)/(amount of change in recording power).

11. The optical disk apparatus according to claim 9, wherein the means for selecting a target quality value selects the initial value as a target value when the initial value is within the range of reproduced signal quality values having a rate of change of gradient K greater than or equal to a predetermined value, said K being defined as K=(amount of change in quality of reproduced signal)/(amount of change in recording power).

12. An optical disk apparatus, comprising:

means for recording test signals on an optical disk while varying a recording power;

means for reproducing the test signals;

means for detecting a $\beta$ value of each reproduced signal;

means for selecting a target $\beta$ value according to a rate of change of the $\beta$ value detected for each recording power; and means for recording data on the optical disk with the recording power by which the target $\beta$ value is produced.

13. The optical disk apparatus according to claim 12, wherein the means for selecting a target $\beta$ value identifies a range wherein thermal distortion is induced and a range wherein thermal distortion is not induced according to the rate of the change of the $\beta$ value, and selects the target $\beta$ value from values within the range wherein thermal distortion is not induced.

14. The optical disk apparatus according to claim 13, wherein the means for selecting a target $\beta$ value selects as the target $\beta$ value the largest $\beta$ value within the range wherein thermal distortion is not induced.

15. The optical disk apparatus according to claim 12, wherein the means for selecting a target $\beta$ value identifies a range wherein thermal distortion is induced and a range wherein thermal distortion is not induced according to the rate of change of the rate of change of the $\beta$ value, and selects the target $\beta$ value from values within the range wherein thermal distortion is not induced.

16. The optical disk apparatus according to claim 15, wherein the means for selecting a target $\beta$ value selects as the target $\beta$ value the largest $\beta$ value within the range wherein thermal distortion is not induced.

17. The optical disk apparatus according to claim 12, further comprising means for storing an initial $\beta$ value, wherein the means for selecting a target $\beta$ value determines the validity of the initial $\beta$ value according to the rate of change of the $\beta$ value, and if determined valid, selects the initial $\beta$ value as the target $\beta$ value.

18. The optical disk apparatus according to claim 12, further comprising means for storing an initial $\beta$ value, wherein the means for selecting a target $\beta$ value selects a range wherein thermal distortion is not induced according to the rate of change of $\beta$ value, selects the initial $\beta$ value as the target $\beta$ value if the initial $\beta$ value is within the range wherein thermal distortion is not induced, and, when the initial $\beta$ value is not within the range wherein thermal distortion is not induced, selects as the target $\beta$ value a value from value within the range wherein thermal distortion is not induced.

19. The optical disk apparatus according to claim 12, further comprising means for storing an initial $\beta$ value, wherein the means for selecting a target $\beta$ value selects a range wherein thermal distortion is not induced according to the rate of change of the rate of change of $\beta$ value, selects the initial $\beta$ value as the target $\beta$ value if the initial $\beta$ value is within the range wherein thermal distortion is not induced, and, when the initial $\beta$ value is not within the range wherein thermal distortion is not induced, selects as the target $\beta$ value a value from value within the range wherein thermal distortion is not induced.

* * * * *